United States Patent [19]
McAferty et al.

[11] Patent Number: 5,882,386
[45] Date of Patent: Mar. 16, 1999

[54] DEVICE FOR SEPARATING MOISTURE FROM GAS VENTED FROM AN AIRCRAFT

[75] Inventors: Blayne A. McAferty; Timothy W. Morgan, both of Seattle; Peter E. Fiala, Bellevue, all of Wash.

[73] Assignee: Aim Aviation, Inc., Renton, Wash.

[21] Appl. No.: 948,614

[22] Filed: Oct. 10, 1997

[51] Int. Cl.⁶ ...................................................... B01D 45/08
[52] U.S. Cl. ............................. 96/378; 55/385.4; 55/410; 55/423; 55/444
[58] Field of Search ................................ 55/446, 444, 462, 55/464, 465, 410, 423, 385.4, 307, 308; 96/378; 95/267, 272

[56] References Cited

U.S. PATENT DOCUMENTS

| | | | |
|---|---|---|---|
| 1,915,521 | 6/1933 | Edwards | 55/446 |
| 2,247,566 | 7/1941 | Walton | 55/446 |
| 3,658,534 | 4/1972 | Straitz, III | 55/444 |
| 4,385,912 | 5/1983 | Parrick et al. | 55/337 |
| 4,589,852 | 5/1986 | Price | 55/446 |
| 4,681,610 | 7/1987 | Warner | 55/338 |
| 4,865,631 | 9/1989 | Stroby et al. | 55/459.1 |
| 5,026,407 | 6/1991 | Tobey | 55/337 |
| 5,149,347 | 9/1992 | Turner et al. | 55/446 |
| 5,538,546 | 7/1996 | Ashton et al. | 96/195 |

OTHER PUBLICATIONS

3 photographs taken in Oct., 1997, of prior art device, in accordance with Monogram Industries Drawing No. 4811–194–TAB, dated Sep. 14, 1972.
Douglas Aircraft Company Water Separator Drawing, dated May 31, 1988, Revision 3 dated Jul. 5, 1994.
Monogram Industries, Inc. Drawing, "Water Separator Instl., 747 Vent System," Revision A, dated Sep. 14, 1972.
Monogram Industries, Inc. Drawing, "Water Separator Assy., 747 Vent System," Revision A, dated Sep. 8, 1972.

*Primary Examiner*—Duane S. Smith
*Attorney, Agent, or Firm*—Seed and Berry LLP

[57] ABSTRACT

A device for separating moisture from a gas flow which is vented from an interior region of an aircraft to a region exterior to the aircraft. In a preferred embodiment, a vessel having an inlet port coupled to the interior region of the aircraft, an outlet port coupled to the region exterior to the aircraft, and at least one baffle member positioned between the inlet port and the outlet port. The baffle member extends away from a wall of the vessel, at least partially transverse to a flow of gas passing through the vessel from the inlet port to the outlet port. The flow passes adjacent to the at least one baffle member such that a surface of the baffle member collects moisture thereon. The moisture is returned, via a canted vessel surface, through the inlet port of the vessel and to the interior region of the aircraft.

11 Claims, 4 Drawing Sheets

DEVICE FOR SEPARATING MOISTURE FROM GAS VENTED FROM AN AIRCRAFT

TECHNICAL FIELD

The present invention is directed toward a method and device for separating moisture from a flow of gas which is vented from an interior region of an aircraft to a region exterior to the aircraft.

BACKGROUND OF THE INVENTION

Lavatories on commercial aircraft are typically vented to prevent undesirable odors from building up therein. Such odors may create an unpleasant environment aboard the aircraft, particularly on long flights. The lavatory vent may comprise a pipe or series of pipes which extend between the lavatory holding tank and the exterior of the aircraft. During flight at typical cruise altitudes, the pressure within the aircraft cabin and within the lavatory holding tank exceeds the pressure outside the aircraft, causing air to flow from the holding tank, through the vent pipes, and to the exterior of the aircraft. As the vented airstream exits the aircraft, it comes into contact with cold air surrounding the aircraft and rapidly cools. Moisture in the vented airstream condenses and forms ice which may adhere to the aircraft fuselage, flight control surfaces, or other external surfaces or components, potentially inhibiting operation of the aircraft. When the aircraft descends to warmer altitudes, the ice may break off and may damage the aircraft surfaces or components, and may also injure persons or property located on the ground below.

One method for reducing the moisture content of a vented airstream includes passing the airstream through a 90 degree bend in the vent pipe before the airstream exits the aircraft. One problem with this method is that a significant amount of moisture may remain in the airstream despite the 90 degree bend, causing ice to build up on the aircraft exterior and break off as discussed above. Another problem is that existing pipe networks may contain gaps which are deliberately formed therein to entrain air from outside the holding tank and thereby reduce the velocity of air vented from the holding tank. The gaps may allow moisture to leak from the pipes into the interior of the aircraft. Such moisture is undesirable because it may promote corrosion of the aircraft and may create slippery or otherwise hazardous working conditions within the aircraft.

Another method for reducing the moisture content of the vented airstream includes passing the air over a series of baffles. One problem with existing baffle devices is that they may not adequately drain the collected moisture into the holding tank. Another problem is that the existing devices may not provide for low velocity flow in the region of the baffles.

SUMMARY OF THE INVENTION

In brief, the present invention provides a method and device for removing moisture from a flow of gas which is vented from an interior compartment of an aircraft to a region exterior to the aircraft. A device in accordance with one embodiment of the invention comprises a vessel having at least one vessel wall, an inlet port, and an outlet port. The inlet port is configured to be in fluid communication with an interior region of the interior compartment and at least a portion of the vessel wall is canted toward the inlet port. An outlet conduit is connected to the outlet port and is in fluid communication with a region exterior to the aircraft when the vessel is installed in the aircraft to evacuate the flow of gas from the aircraft compartment when a pressure in the exterior region is less than a pressure within the interior region of the compartment. The outlet conduit has an aperture therein to entrain gas from a region exterior to the interior compartment and interior to the aircraft. The vessel further comprises at least one baffle member positioned within the vessel between the inlet port and the outlet port. The baffle member has at least one collection surface positioned at least partially transverse to a flow of gas passing through the vessel from the inlet port to the outlet port.

In one embodiment, the vessel of the device has a generally cylindrical shape. In another embodiment, the vessel has a generally rectangular shape, and the baffle member comprises a channel having first and second elongated and opposite side members. The baffle member further comprises an intermediate member extending between the side members. The side members are connected to opposing walls of the rectangular vessel. In a further aspect of this embodiment, the intermediate member is canted toward one or more walls of the vessel so as to direct moisture collected thereon toward the respective wall or walls of the vessel.

The invention also provides a method for removing moisture from a flow of gas vented from an aircraft. In one embodiment, the method comprises passing the flow of gas through a vessel and adjacent at least one baffle member extending away from a first wall portion of the vessel and positioned at least partially transverse to the flow. The method further comprises collecting moisture from the flow of gas on a surface of the at least one baffle member, transferring the moisture to a second wall portion of the vessel adjacent the inlet port, and returning the moisture by gravity from the second wall portion to the inlet port.

DETAILED DESCRIPTION OF THE INVENTION

Figure 1:
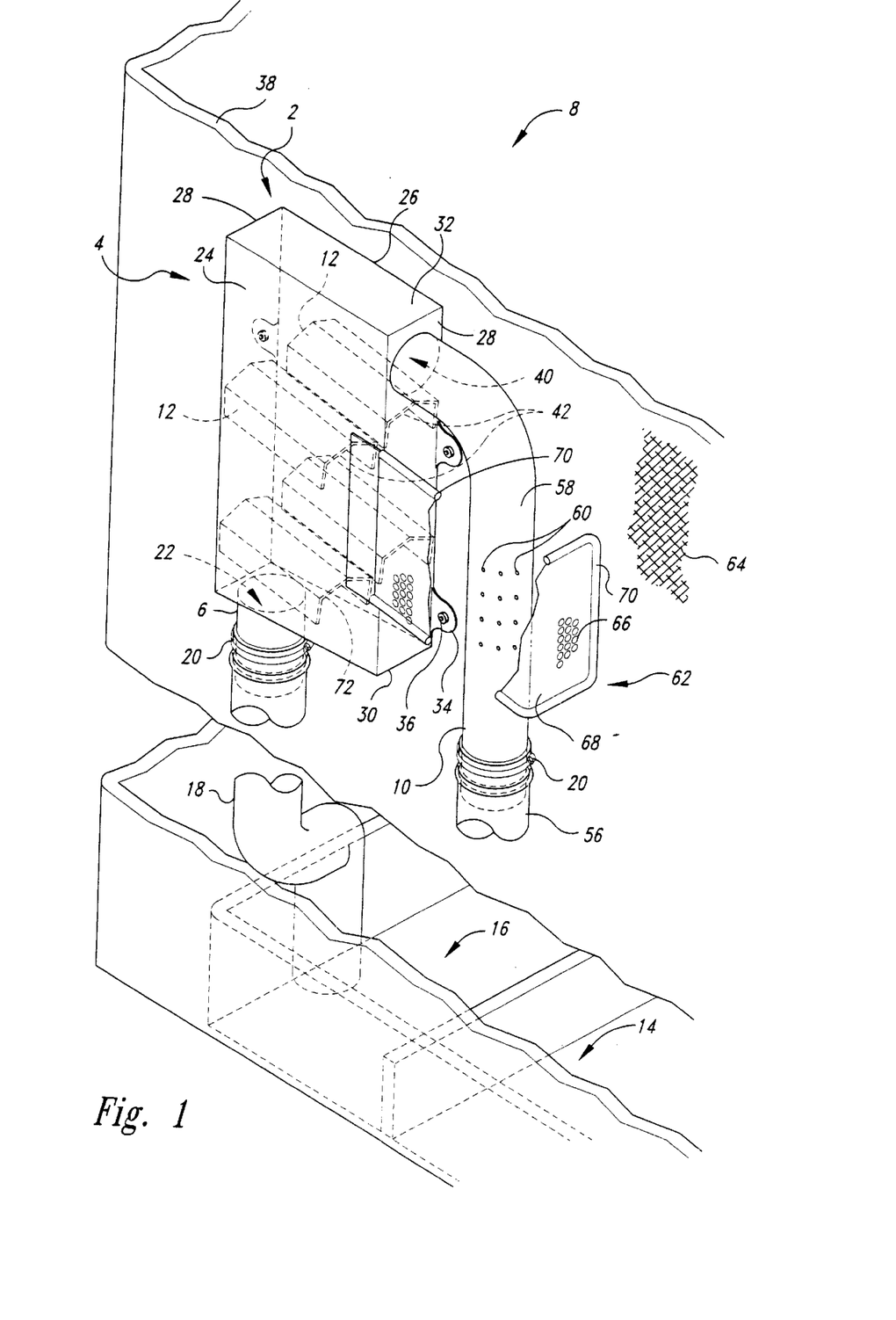
FIG. 1 is a partially broken isometric view of a portion of an aircraft lavatory having a vent device with a plurality of baffle members therein in accordance with an embodiment of the present invention.

As discussed above, the present invention is directed toward a device for separating moisture from gas which is vented from an aircraft compartment, such as a lavatory. As shown in FIG. 1, a vent device 2 in accordance with an embodiment of the invention comprises a vessel 4 coupled with an inlet conduit 6 to an aircraft compartment 8. An outlet conduit 10 couples the vessel 4 to a region exterior to the aircraft (not shown). Baffle members 12 positioned within the vessel 4 separate moisture from a flow of gas which passes from the compartment 8, through the vessel 4, and out the aircraft when the pressure outside the aircraft is less than the pressure inside the compartment.

In the embodiment shown in FIG. 1, the compartment 8 to which the vent device 2 is coupled comprises a lavatory. In one embodiment, the lavatory may be a model number AA10006-1, AA10006-2, or AA10007-1 manufactured by AIM Aviation of Renton, Wash., and in other embodiments, the compartment 8 may comprise other types of lavatories. The compartment 8 may accordingly include a black water holding tank 14 which collects waste materials from a toilet (not shown) positioned within the compartment. In one embodiment, the holding tank 14 is a model number 835880-401, 835881-401, or 835881-402, manufactured by Weber Aircraft of Fullerton, Calif., and in other embodiments, the holding tank may be of other types.

In one embodiment, the holding tank 14 may include an overflow portion 16 which receives waste materials from the remainder of the holding tank when a level of waste materials within the remainder exceeds a selected level. The overflow portion 16 may comprise a walled section of the holding tank 14, as shown in FIG. 1, or may comprise a pipe projecting from the holding tank. The overflow portion 16 is accordingly normally dry. A vent conduit 18 is sealably connected to the overflow portion 16 of the holding tank 14 and is sized to vent gas from the holding tank 14 at a selected rate. Because the overflow portion 16 is normally dry, the amount of moisture entrained by the flow of gas exiting the holding tank 14 through the vent conduit 18 is reduced. In another embodiment, the overflow portion 16 may be eliminated and the vent conduit 18 may be connected directly to the holding tank 14.

In an alternate embodiment, the vent conduit 18 may be coupled to other tanks or fixtures within the compartment 8 which may require venting, such as a gray water holding tank which receives water from a sink, drinking fountain, or other device (not shown). In still further alternate embodiments, the vent conduit 18 may be connected to other compartments within the aircraft which may also require venting. Such compartments may include the aircraft galleys, among others. Accordingly, the gas vented from the compartment 8 may comprise air or other gases or gas mixtures. The moisture contained within the gas flow may comprise water or other substances, which may include, but are not limited to, anti-foaming agents.

In the embodiment shown in FIG. 1, the vent conduit 18 comprises a flexible hose which is connected to the inlet conduit 6 of the vessel 4 using a clamp 20 or other conventional attachment means. In other embodiments, the vent conduit 18 may comprise rigid tubing. In one embodiment, the connection between the vent conduit 18 and the inlet conduit 6 may be easily disconnected so that the vessel 4 may be removed, should removal become necessary.

The inlet conduit 6 has one open end sealably coupled to the vent conduit 18 at the connection therebetween and a second open end sealably coupled to an inlet port 22 of the vessel 4. The inlet conduit 6 may comprise stainless steel or other rigid, corrosion-resistant materials which are suitable for forming liquid- and/or gas-tight seals between inlet conduit 6 and both the vent conduit 18 and the inlet port 22 of the vessel 4.

In one embodiment, the vessel 4 has a generally rectangular shape and comprises a front wall 24 spaced apart from a rear wall 26. Sidewalls 28 are connected to and extend between the front wall 24 and rear wall 26. A lower wall 30 and upper wall 32 are connected between the sidewalls 28 and between the front and rear walls 24 and 26. Mounting brackets 34 project outwardly from the sidewalls 28 adjacent the rear wall 26. The mounting brackets are configured to be mounted with conventional clip nuts 36 or other fasteners to a wall 38 of the compartment 8. In a preferred embodiment, the vessel 4 is attached using through-inserts which may be installed from the interior of the compartment 8. Accordingly, the compartment 8 need not be removed from the aircraft in order to install the vessel 4.

In a preferred embodiment, the inlet port 22 is positioned toward one end of the lower wall 30. The inlet port 22 is configured to receive incoming gas from the inlet conduit 6 at a selected velocity and direct the gas into the vessel 4. In a preferred embodiment, the inlet port 22 is large enough to direct the gas into the vessel 4 at a relatively low velocity, so that moisture contained in the gas flow is more likely to precipitate therefrom. In addition, the inlet port 22 is configured to receive moisture collected in the vessel 4 and direct the moisture back through the inlet conduit 6 and into the holding tank 14. Accordingly, the lower wall 30 is preferably canted relative to the horizontal and toward the inlet port 22 so that moisture collected in the vessel 4 will tend to flow under the force of gravity toward the inlet port and into the inlet conduit 6. Furthermore, by sizing the inlet port 22 and inlet conduit 6 to convey gas therethrough at a relatively low velocity, the likelihood that the gas will re-entrain moisture returning to the holding tank 14 is reduced.

The vessel 4 further includes an outlet port 40 positioned in one of the walls thereof. The outlet port 40 is sized and shaped to be coupled to the outlet conduit 10 and to receive the flow of gas passing through the vessel 4 from the inlet port 22. In a preferred embodiment, the outlet port 40 is positioned above the inlet port 22 so that moisture extracted from the flow by the baffle members 12 will tend to return to the inlet port under the force of gravity, as will be discussed in greater detail below.

The baffle members 12 of the vessel 4 are positioned between the inlet port 22 and the outlet port 40. As shown in FIG. 1, the baffle members 12 project inwardly from the sidewalls 28 and extend at least partially transverse to a direct path between the inlet port 22 and the outlet port 40. The gas flow passing between the inlet port 22 and the outlet port 40 must accordingly turn sharply to pass around each baffle member 12. As the gas flow turns, the heavier moisture particles within the flow tend to continue in a straight path, impinge on lower collection surfaces 42 of the baffle members 12, and separate from the flow. The collected moisture precipitates toward the lower wall 30, where it is directed to the inlet port 22, as discussed above.

In a preferred embodiment, adjacent baffle members 12 abut opposite sidewalls 28, forcing the gas flow to make a circuitous path between the inlet port 22 and the outlet port 40. The number of baffle members 12 is preferably chosen to separate a large amount of moisture from the flow without causing the flow to lose so much pressure that it is unable to pass through the outlet conduit 10 to the exterior of the aircraft. In one embodiment, the vessel 4 may comprise four baffle members spaced sufficiently far apart to allow the gas flow to pass easily therebetween, as shown in FIG. 1. In alternate embodiments, the vessel 4 may comprise a greater or lesser number of baffle members 12, so long as the baffle members remove a sufficient amount of moisture from the gas flow passing therethrough, and the gas flow does not suffer too large a pressure drop as it passes through the vessel. As shown in FIG. 1, adjacent baffle members 12 may be positioned parallel to each other. In other embodiments, the baffle members 12 may be canted relative to each other, as will be discussed in greater detail below with reference to FIG. 3.

Figure 2:
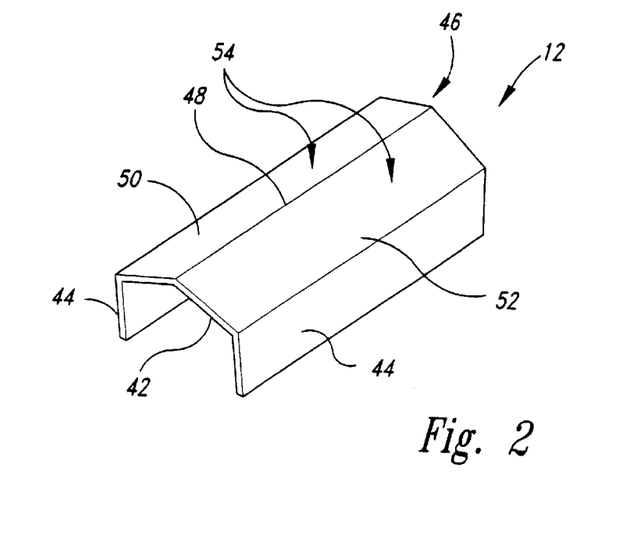
FIG. 2 is a detailed isometric view of one of the baffle members shown in FIG. 1.

FIG. 2 is an enlarged isometric view of one of the baffle members 12 shown in FIG. 1. As shown in FIG. 2, the baffle member 12 may have a channel shape and comprise two elongated and spaced apart side members 44 connected by an intermediate member 46 which extends therebetween. The side members 44 are preferably spaced apart by a distance approximately equal to the distance between the inner surfaces of front wall 24 and rear wall 26 of the vessel 4 so that the baffle member 12 may be easily positioned within the vessel between the front wall and rear wall. Once positioned within the vessel 4, the side members 44 may be welded or otherwise attached to the front wall 24 and rear wall 26. In the embodiment shown in FIG. 1, the baffle member 12 is installed in the vessel 4 such that the intermediate member 46 is positioned above the side members 44. In an alternate embodiment, the baffle member 12 may be inverted so that the intermediate member 46 is positioned below the side members 44.

In a preferred embodiment, the intermediate member 46 may be bent along a ridge line 48 so as to cant adjacent intermediate member portions 50 and 52 toward the side members 44. Moisture collected on the lower collection surface 42 may accordingly be directed away from the ridge line 48 under the force of gravity toward one or the other of the side members 44, then toward the front wall 24 or rear wall 26, and finally toward the inlet port 22. In a similar manner, moisture which may collect on an upper collection surface 54 of the intermediate member 46 may also be directed toward the inlet port 22. Moisture may collect on the upper collection surface 54 by flowing or dripping from a baffle member 12 positioned above the upper collection surface.

In one embodiment, the side members 44 and intermediate member 46 are integrally formed and may comprise a section of commercially available channel stock. In other embodiments, the side members 44 may be eliminated and the intermediate member 46 connected directly to the walls of the vessel 4. In still further embodiments, the baffle members 12 may comprise other shapes which also redirect the gas flow in the vessel 4 and extract moisture therefrom.

Returning to FIG. 1, the gas flow passes out of the vessel 4 through the outlet port 40 and into the outlet conduit 10. The outlet conduit 10 preferably comprises stainless steel and may comprise other rigid, corrosion resistant materials in other embodiments. The outlet conduit 10 is removably coupled with a clamp 20 to an exit conduit 56 which may comprise a flexible hose in a preferred embodiment or a rigid tube in other embodiments. The exit conduit 56 is coupled to a port on the external surface of the aircraft fuselage (not shown) to remove the vented gas flow from the aircraft.

In a preferred embodiment, the outlet conduit 10 includes an intermediate portion 58 between the outlet port 40 and the exit conduit 56 which is perforated with conduit apertures 60 extending through a wall thereof. The conduit apertures 60 are sized to entrain a selected amount of gas from a region exterior to the compartment 8 and interior to the aircraft. The gas flow entrained through the conduit apertures 60 reduces the rate at which gas is extracted from the compartment 8 through the inlet port 22 because the outlet conduit 10 has a limited flow capacity at any given temperature and pressure. Because the gas flow into the inlet port 22 is reduced, the velocity of gas passing through the inlet port is less than it would be were the conduit apertures 60 not provided. As discussed above, the low velocity gas is more likely to precipitate moisture contained therein because the moisture has less momentum and is accordingly less likely to pass completely through the vessel 4 and into the outlet conduit 10.

In a preferred embodiment, 32 conduit apertures 60 are arranged in four rings having 8 conduit apertures each. In other embodiments, the outlet conduit may have a greater or lesser number of conduit apertures. In still further embodiments, other means may be used to reduce the velocity of the flow entering the vessel 4 through the inlet port 22. In one such embodiment, a flow restrictor may be positioned upstream or downstream of the vessel 4 to reduce the velocity of gas passing therethrough. The flow restrictor may comprise a portion of the inlet conduit 6 or outlet conduit 10 having a reduced flow area. An advantage of the flow restrictor may be that it is easier to construct than the perforated outlet conduit 10 shown in FIG. 1. Conversely, an advantage of the perforated conduit 10 may be that the gas passing therethrough undergoes a reduced pressure drop compared to gas passing through a flow restrictor and will accordingly exit the aircraft even when the pressure outside the aircraft, though less than the pressure of the gas flow, is relatively high. The perforated conduit 10 may therefore permit operation of the vent device 2 over a greater range of aircraft altitudes.

In a preferred embodiment, the vent device 2 includes a guard member 62, shown partially broken away in FIG. 1, which is spaced apart from the intermediate portion 58 of the outlet conduit 10. The guard member 62 is positioned between the intermediate portion 58 and any insulation 64 which may be located adjacent the outlet conduit 10 and the vessel 4. For purposes of clarity, only a portion of the insulation 64 which may be adjacent the outlet conduit 10 is shown in FIG. 1. The guard member 62 has apertures or perforations 66 therein, a fraction of which are shown in FIG. 1. The apertures 66 are of sufficient size and number to allow gas to pass through the guard member and into the conduit apertures 60. At the same time, the apertures 66 of the guard member 62 are small enough to generally prevent the insulation 64 from passing through the conduit apertures 60.

In one embodiment, the guard member 62 comprises a screen 68 which is attached at its periphery to a screen frame 70. The screen frame 70 may comprise metal tubing or another material which is sufficiently rigid to support the screen 68 in a spaced apart position relative to the conduit 10. In other embodiments, the guard member 62 may comprise other materials and configurations which similarly allow gas to pass from a region proximate to the outlet conduit 10 through the conduit apertures 60, without also allowing the insulation 64 to pass into the outlet conduit. In the embodiment shown in FIG. 1, the guard member 62 depends from the vessel 4 and abuts the compartment wall 38 to shield most of the conduit apertures 60 from the insulation 64. In other embodiments, the guard member 62 may depend from and encircle the outlet conduit 10, as will be discussed in greater detail below with reference to FIG. 5.

One advantage of an embodiment of the vent device 2 shown in FIG. 1 is that the baffle members 12 force the vented gas flow along a circuitous path, causing moisture contained in the gas flow to separate therefrom as the flow turns. This is advantageous because it reduces the likelihood that moisture within the flow will pass through the outlet conduit 10 and to the exterior of the aircraft, where it may freeze and later break off, causing damage to the aircraft and/or persons or property over which the aircraft passes.

Another advantage of an embodiment of the vent device 2 shown in FIG. 1 is that moisture extracted from the gas flow passing through the vessel 4 is returned to the holding tank 14 from which the flow is vented. The canted lower wall 30 and canted baffle members 12 may individually and together direct the moisture toward the inlet port 6 and holding tank 14. This is advantageous because it reduces the likelihood that the extracted moisture will be deposited outside the holding tank 14, where it may cause corrosion or create slippery surfaces or otherwise hazardous working conditions.

Yet a further advantage of an embodiment of the vent device 2 shown in FIG. 1 is that the outlet conduit 10 includes conduit apertures 60 which reduce the speed with which gas passes through the inlet port 22 into the vessel 4. This is advantageous because the low speed gas flow is less likely to carry relatively heavy moisture particles therein. Accordingly, the conduit apertures 60 may reduce the moisture content of the vented gas flow even before the flow passes adjacent the baffle members 12.

Still a further advantage of an embodiment of the vent device 2 is that the conduit apertures 60 are positioned downstream of the baffle members 12. The likelihood that moisture may exit the vent device 2 through the conduit apertures 60 is accordingly reduced because moisture has been extracted from the gas flow before the flow passes the conduit apertures.

Yet a further advantage of an embodiment of the vent device 2 is that the guard member 62 may prevent solid materials such as the insulation 64 from becoming entrained in the flow of vented gas. Accordingly, the solid materials may have a reduced tendency to be ejected from the aircraft and may have a reduced tendency to clog the conduit apertures 60.

Figure 3:
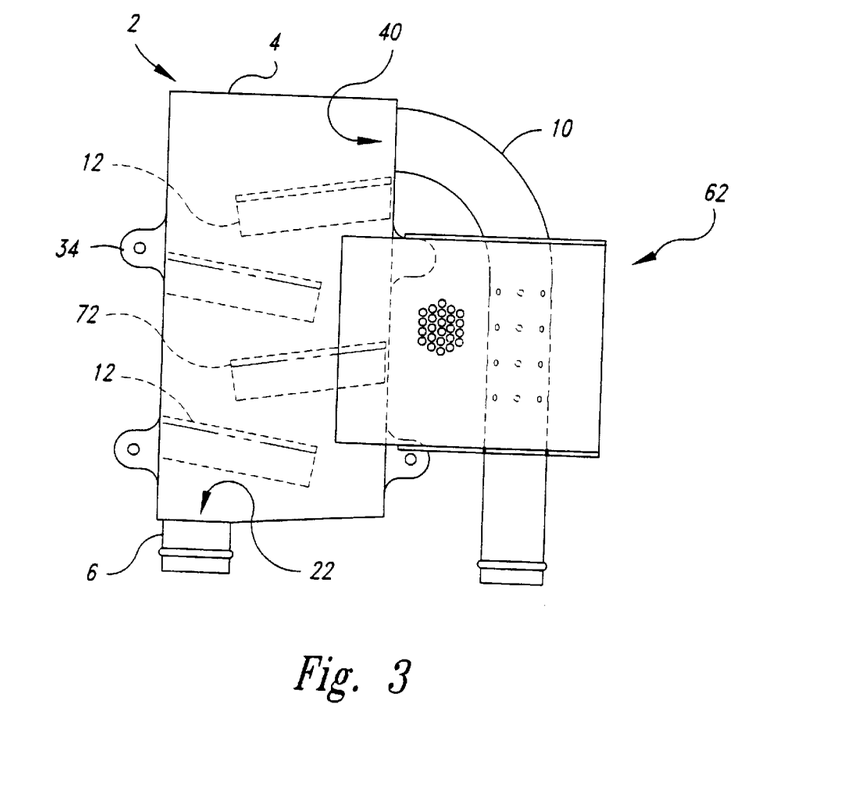
FIG. 3 is a side view of a device in accordance with another embodiment of the invention having baffle members therein canted relative to each other.

FIG. 3 is a side view of an alternate embodiment of the vent device 2 shown in FIG. 1 having baffle members 12 canted relative to each other. As shown in FIG. 3, the flow path between the inlet 22 and the outlet 40 of the vessel 4 has a changing flow area, alternating between a reduced flow area where an end 72 of one baffle member 12 is proximate the neighboring baffle member, and an enlarged flow area beyond the end 72. The flow passing through the vessel 4 accordingly accelerates as it passes through the reduced flow area regions and decelerates as it passes through the enlarged flow area regions. As the flow decelerates, it loses momentum and moisture contained therein may be more likely to precipitate from the flow. Accordingly, an advantage of the vent device 2 shown in FIG. 3 may be that the canted baffle members 12 increase the amount of moisture removed from the vented flow passing therethrough.

Figure 6:
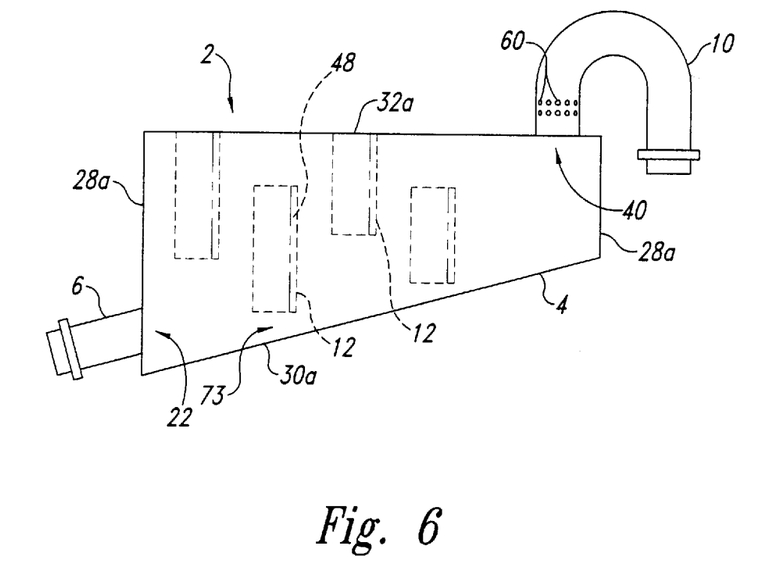
FIG. 6 is a side view of a device in accordance with another embodiment of the invention having baffle members positioned vertically therein.

FIG. 6 is a side view of another embodiment of a vent device 2 having baffle members 12 disposed vertically in the vessel 4. The inlet port 22 is positioned in a sidewall 28a and the outlet port 40 is positioned in the upper wall 32a. The lower wall 30a is canted toward the inlet port 6 to direct moisture thereto, substantially as discussed above with reference to FIG. 1. The outlet conduit 10 is connected to the outlet port 40 and may include conduit apertures 60 which are shielded by a guard member, which is not shown in FIG. 6 for purposes of clarity.

In one embodiment, the baffle members 12 are oriented in a generally vertical direction between the upper wall 32a and the lower wall 30a, as shown in FIG. 6. In other embodiments, the baffle members 12 may be oriented in non-vertical directions, so long as they separate moisture from the gas flow passing through the vessel 4. As discussed above with reference to FIG. 1, the baffle members 12 are staggered to direct the gas flow passing through the vessel 4 along a circuitous path. In a preferred embodiment, the baffle members 12 are offset from the lower surface 30a leaving a gap 73 therebetween sized to allow the moisture to flow along the lower surface 30a toward the inlet port 6. The baffle members may be bent along the ridge line 48, or may comprise flat plates or other shapes which direct moisture toward the inlet port 6. The baffle members 12 may be parallel to each other, as shown in FIG. 6, or may be canted with respect to each other, in a manner similar to that discussed above with reference to FIG. 3.

Figures 4, 5:
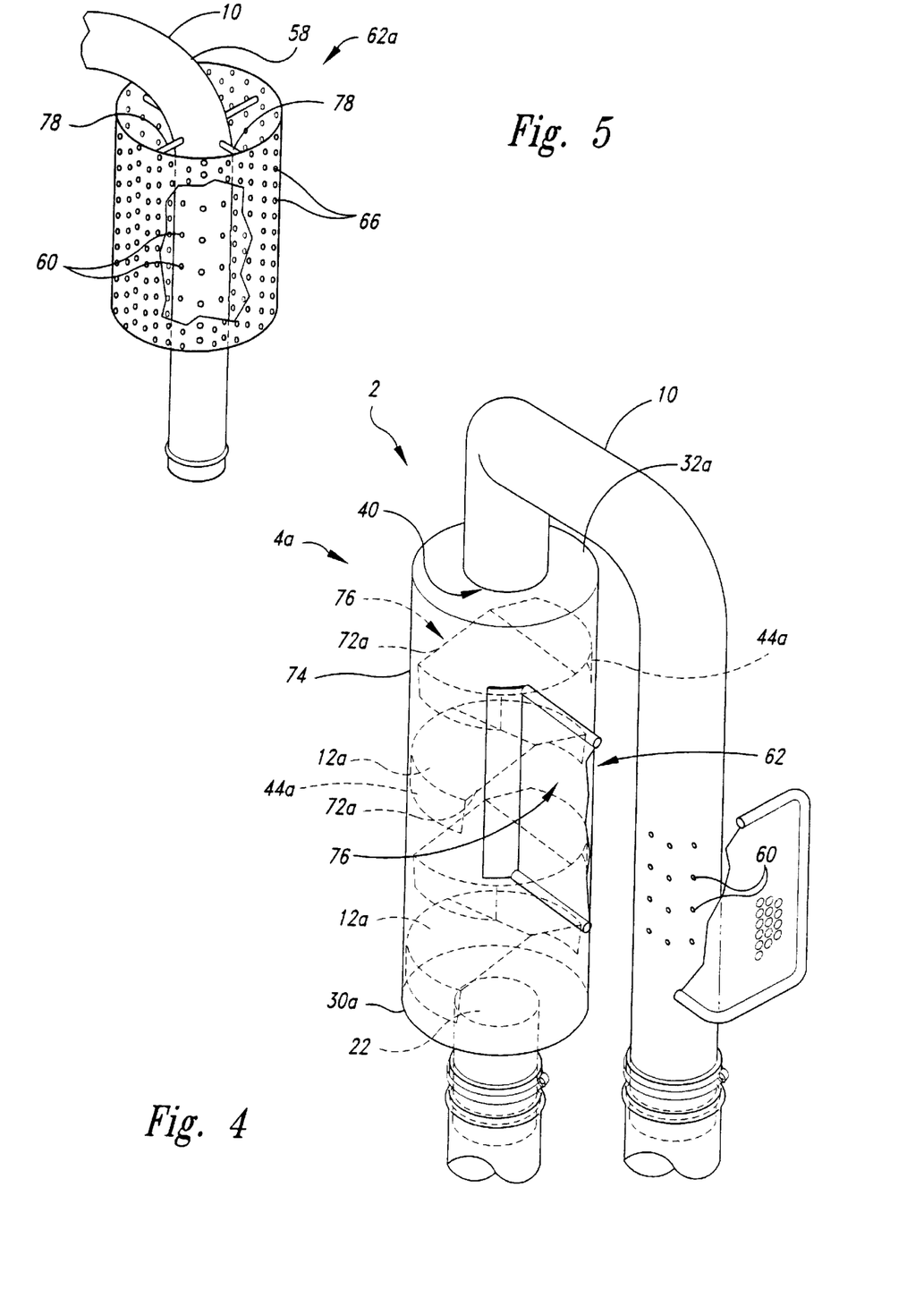
FIG. 4 is a side view of a device in accordance with yet another embodiment of the invention having a cylindrical vessel with baffle members positioned therein.
FIG. 5 is an isometric view of an outlet conduit having a guard member in accordance with still another embodiment of the invention.

FIG. 4 is a side view of an alternate embodiment of the vent device 2 having a cylindrical vessel 4a. The vessel 4a is elongated along an axis extending between the inlet port 22 and the outlet port 40 and comprises a curved vessel wall 74 defining a generally cylindrical interior volume having a circular cross-sectional shape. The lower wall 30a may have a funnel-shape so as to be inclined toward the inlet port 22, or the lower wall and upper wall 32a may be eliminated and the inlet port and outlet port 40 may comprise the open ends of the cylindrical vessel 4a.

Baffle members 12a are arranged within the vessel 4a at least partially transverse to the flow of gas passing from the inlet port 22 to the outlet port 40. Accordingly, the baffle members 12a are sized to extend inwardly away from the wall 74 while leaving a gap 76 between the wall and the ends 72a of the baffle members sufficient to allow the vented gas to pass by. The baffle members 12a may be canted relative to each other, as shown in FIG. 4 or may be positioned generally parallel to each other, in a similar manner to that shown in FIG. 1. The baffle members 12a may have side members 44a which are welded to the inner surface of the wall 74, or may be attached using other means. In one alternate embodiment, the baffle members 12a may comprise flat plates which have a size the same as or slightly larger than the cross-sectional shape of the vessel 4a and which may be inserted into diagonal slots (not shown) in the vessel wall 74. In this alternate embodiment, the baffle members 12a may be advantageously welded to the vessel wall 74 from the outside, rather than the inside, of the vessel 4a.

An advantage of the cylindrical vessel 4a shown in FIG. 4 is that it may be simpler to construct than the rectangular vessel 4 shown in FIG. 1. The wall 74 of the cylindrical vessel 4a may comprise a section of readily available tubing or piping, the open ends of which may comprise the inlet port 22 and the outlet port 40, respectively. Conversely, an advantage of the rectangular vessel 4 shown in FIG. 1 is that it may have the same flow area as the circular vessel 4a shown in FIG. 4 but may be sized so as to project only a limited distance beyond the wall 38 of the compartment 8. This may be advantageous where space between the compartment wall 38 and other components of the aircraft, such as the inner surface of the fuselage, is limited.

FIG. 5 is an isometric view of an alternate embodiment of a guard member 62a mounted to the outlet conduit 10. The guard member 62a has a generally cylindrical shape with a diameter greater than a diameter of the intermediate portion 58 of the outlet conduit 10. The guard member 62a is accordingly positioned around the intermediate portion 58 and is connected to and spaced apart from the outlet conduit 10 with stand-off members 78. The guard member 62a includes apertures 66 which prevent insulation 64 (FIG. 1) from entering the conduit apertures 60, substantially as discussed previously with reference to FIG. 1. In alternate embodiments, the guard member 62 may have other shapes and configurations which similarly allow gas to enter the outlet conduit 10 through the conduit apertures 60, while simultaneously preventing or restricting the motion of the insulation 64 into the conduit aperture.

An advantage of the guard member 62a shown in FIG. 5 is that it completely surrounds the intermediate portion 58 of the outlet conduit 10 containing the conduit apertures 60 and may accordingly further prevent insulation 64 from entering the outlet conduit. Conversely, an advantage of the guard member 62 shown in FIG. 1 may be that it is relatively simple to manufacture and attach. Furthermore, the guard member 62 shown in FIG. 1 may have a reduced size because it abuts the compartment wall 38, allowing the compartment wall to effectively form a portion of the guard member.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A device for venting gas from an interior compartment of an aircraft, comprising:

a vessel having at least one vessel wall, the vessel further having an inlet port and an outlet port, the inlet sort being configured to be in fluid communication with an interior region of the interior compartment, at least a portion of the vessel wall being canted toward the inlet port to direct moisture thereto;

at least one baffle member positioned within the vessel between the inlet port and the outlet port, the baffle member having at least one collection surface positioned at least partially transverse to a flow of gas passing through the vessel, the flow of gas passing from the interior compartment through the inlet port to the outlet port, the collection surface being positioned to collect moisture from the flow of gas;

an outlet conduit connected to the outlet port of the vessel, the outlet conduit being in fluid communication with a region exterior to the aircraft when the vessel is installed in the aircraft to evacuate the flow of gas from the interior compartment when a pressure in the exterior region is less than a pressure within the interior region of the interior compartment, the outlet conduit having a conduit wall with at least one conduit aperture therein to entrain gas from a region exterior to the interior compartment and interior to the aircraft; and a guard member positioned between the conduit aperture and a solid material positioned proximate the guard member, the guard member having at least one guard member aperture therein positioned to allow gas to pass therethrough and into the at least one conduit aperture, the guard member aperture being sufficiently small to at least restrict motion of the solid material into the at least one conduit aperture.

2. The device of claim 1 wherein the guard member comprises a perforated screen.

3. A device for venting gas from an aircraft lavatory holding tank, comprising:

a generally rectangular vessel having a first end wall and a second end wall opposite and spaced apart from the first end wall, first and second spaced apart sidewalls positioned between and connected to the first and second end walls, a front wall positioned between and connected to the first and second sidewalls and the first and second end walls, a rear wall spaced apart from the front wall and positioned between and connected to the first and second sidewalls and the first and second end walls, the vessel having an inlet port in the first end wall and an outlet port toward the second end wall, the inlet port being positioned beneath the outlet port and being in fluid communication with the interior of the holding tank when the vessel is installed in the aircraft, the first end wall being canted toward the inlet port;

a plurality of baffle members positioned within the vessel, each baffle member having at least one collection surface positioned at least partially transverse to a flow of gas passing from the holding tank, through the inlet port and through the vessel to the outlet port, the collection surface being positioned to collect moisture from the flow of gas, each of the plurality of baffle members being offset from the other to permit the flow to pass therebetween;

an outlet conduit connected to the outlet port of the vessel, the outlet conduit being in fluid communication with a region exterior to the aircraft when the vessel is installed in the aircraft to evacuate the flow of gas from the holding tank when a pressure in the exterior region is less than a pressure within the holding tank, the outlet conduit having an intermediate portion between holding tank and the exterior region, the intermediate portion having a plurality of conduit apertures therein positioned to entrain gas from a region adjacent the intermediate portion into the outlet conduit; and a screen member positioned proximate at least one of the plurality of conduit apertures, the screen member having perforations therein positioned to allow gas to pass therethrough and into the plurality of conduit apertures.

4. The device of claim 3 wherein the collection surface of at least one of the baffle members is canted toward the inlet port and canted toward both the front wall and the rear wall.

5. The device of claim 3 wherein the collection surfaces of adjacent baffle members are canted relative to each other.

6. The device of claim 3 wherein the collection surfaces of adjacent baffle members are parallel to each other.

7. The device of claim 3 wherein the baffle member comprises a channel having first and second elongated and opposing side members, each side member having an upper edge and a lower edge, the baffle member further comprising an intermediate member extending between and connected to the upper edges of the side members, the first side member being connected to the front wall and the second side member being connected to the rear wall of the vessel.

8. The device of claim 3 wherein the screen member is supported by the vessel in a position spaced apart from the outlet conduit.

9. The device of claim 3 wherein the screen member is supported in a position spaced apart from the outlet conduit by at least one stand-off member connected at one end to the screen member and connected at an opposite end to the outlet conduit.

10. The device of claim 3 wherein the plurality of conduit apertures comprises 32 conduit apertures arranged in four parallel rows around a circumference of the outlet conduit.

11. A device for removing moisture from a first flow of gas passing from an aircraft lavatory to a region exterior to the aircraft, the device comprising:

a vessel having a first end wall and a second end wall opposite the first end wall the vessel having an inlet port in the first end wall and an outlet port toward the second end wall, the first end wall being canted toward the inlet port, the inlet port being sealably couplable to an interior portion of the lavatory, the outlet port being configured to be in fluid communication with the region exterior to the aircraft;

moisture collection means within the vessel for collecting moisture from the flow of gas as the flow passes through the vessel from the inlet port to the outlet port;

gas entrainment means coupled to the outlet port and positioned to entrain a second flow of gas from a region exterior to the lavatory and interior to the aircraft, and combine the first and second flows; and guard means positioned at least proximate the gas entrainment means to restrict motion of materials exterior to the vessel toward at least one of the first and second flows of gas.

\* \* \* \* \*